(12) United States Patent
Sun

(10) Patent No.: US 8,334,805 B2
(45) Date of Patent: Dec. 18, 2012

(54) DIGITAL FRONT END FOR A SATELLITE NAVIGATION RECEIVER

(75) Inventor: Qinfang Sun, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 682 days.

(21) Appl. No.: 12/173,677

(22) Filed: Jul. 15, 2008

(65) Prior Publication Data

US 2010/0013706 A1    Jan. 21, 2010

(51) Int. Cl.
*G01S 19/21* (2010.01)
*G01S 19/35* (2010.01)

(52) U.S. Cl. .............................. 342/357.59; 342/357.75

(58) Field of Classification Search .. 342/357.2–357.78, 342/357.77, 357.59, 357.75; 375/148, 150
See application file for complete search history.

(56) References Cited

U.S. PATENT DOCUMENTS

| 5,872,540 | A  | * | 2/1999  | Casabona et al. ............. 342/362 |
| 6,236,354 | B1 |   | 5/2001  | Krasner |
| 6,633,814 | B2 |   | 10/2003 | Kohli et al. |
| 7,317,752 | B2 | * | 1/2008  | Dong-Sik ..................... 375/148 |
| 2003/0112905 | A1 | * | 6/2003 | Heinzl et al. ................. 375/350 |
| 2005/0208916 | A1 |   | 9/2005 | Peterzell et al. |
| 2005/0250459 | A1 | * | 11/2005 | Tervaluoto et al. ........ 455/127.2 |
| 2006/0125688 | A1 | * | 6/2006  | Henderson et al. ........... 342/379 |
| 2008/0123761 | A1 | * | 5/2008  | Choi et al. ..................... 375/260 |
| 2008/0316096 | A1 | * | 12/2008 | Bochkovskiy et al. .. 342/357.12 |
| 2009/0295631 | A1 | * | 12/2009 | Wu et al. ................. 342/357.12 |

FOREIGN PATENT DOCUMENTS

| DE | 112008003937 T5 | 7/2011 |
| GB | 2474186 | 4/2011 |
| TW | 201003106 | 1/2010 |
| WO | WO 2010/008369 A1 | 1/2010 |

OTHER PUBLICATIONS

International Search Report and Written Opinion—PCT/US2008/013533, ISA/US, Feb, 5, 2009.

\* cited by examiner

*Primary Examiner* — Gregory C Issing
*Assistant Examiner* — Nga X Nguyen
(74) *Attorney, Agent, or Firm* — Mahamedi Paradice Kreisman LLP

(57) ABSTRACT

A satellite navigation receiver having a digital front end. The satellite navigation receiver includes an analog section for receiving, amplifying, and filtering a satellite navigation signal. The digital front end is coupled to the analog section and is used to perform digital signal processing on the satellite navigation signal before it is passed on to the acquisition and tracking engines. By off-loading some of the functionality from the analog section to the digital front end, the analog section may be made smaller and cheaper and may consume less power. Moreover, additional functionalities can be added to the digital front end to improve performance. Since the digital front end is comprised of digital circuitry, it scales down in size, cost, and power with advances in semiconductor fabrication techniques.

19 Claims, 9 Drawing Sheets

DIGITAL FRONT END FOR A SATELLITE NAVIGATION RECEIVER

BACKGROUND

1. Field of the Invention

Embodiments of the present invention generally relate to satellite navigation receivers and more particularly to GPS receivers having a digital front end.

2. Description of the Related Art

Satellite navigation systems are made up of multiple, specially designed satellites orbiting Earth. These satellites continuously transmit precise, specific radio frequency (RF) signals that are used to provide location information. One widely adopted satellite navigation system is referred to as the Global Positioning System (GPS). By processing the RF signals from four or more GPS satellites, a GPS receiver can determine its current location (longitude, latitude, and altitude) fairly quickly and with a good degree of accuracy.

FIG. 1 shows the general sections of a conventional GPS receiver. An antenna 101 receives the RF signals from the GPS satellites. The RF signals are then amplified, down converted, filtered, and converted into a digital signal by the analog section 102. Specifically, a low-noise amplifier 103 amplifies the weak RF signals. A mixer 104 and local oscillator 105 down converts the amplified RF signals to a lower intermediate frequency (IF) signal. A band pass filter 106 is used to filter out interference. The filtered IF signal is then converted into an equivalent digital IF signal by means of a 1 or 2-bit analog-to-digital converter (ADC) 107. The digital IF signal is then input to a digital section 108. The acquisition engine 109 and tracking engine 110 of the digital section 108 process the digital IF signal to generate acquisition and tracking data which is then input to the processing section 112 by means of register 111. The central processing unit (CPU) 113 analyzes the acquisition and tracking data according to programming instructions stored in the memory 114 and produces the final location information.

This conventional GPS receiver architecture places a great deal of reliance on the performance of the analog section. This is due, in part, because GPS satellite transmitter power may be as low as approximately 22 watts, and the signal travels over 12,000 miles through space and Earth's atmosphere. By the time the GPS signal reaches the GPS receiver, it is extremely weak and degraded. Typically, the received power of a GPS signal is −130 dBm or below. As a result, the analog section 102 must amplify, filter, and perform significant signal processing on the weak, attenuated analog GPS signal before it can be converted into a digital signal by the ADC 107.

Further complicating matters is that the GPS signal encounters a variety of interferences. Unfortunately, the GPS band falls within a crowded frequency spectrum, with strong RF signals that are only a few tens of MHz on either side of the protected GPS band. In addition, RF leakage and harmonics of the digital clock in the GPS receiver may appear to be very close or even fall within the GPS band. And if interference signal(s) are present at the input to the ADC 107, then some of the ADC's dynamic range is allocated to accommodate for this interference in order to avoid severe clipping. As a consequence, the desired GPS signal is sized smaller, the quantization noise relative to the thermal noise increases, and the overall performance of the GPS receiver degrades. To account for these and other deleterious factors, the design of the analog section must meet extremely stringent and exacting specifications. Consequently, the analog section occupies a relatively large area of circuitry, consumes a great amount of power, and is expensive to implement.

Therefore, the analog section is fast becoming a major impediment to the introduction of smaller, cheaper, lighter, more accurate, longer lasting portable battery-operated GPS receivers that markets and consumers crave.

SUMMARY

This Summary is provided to introduce a selection of concepts in a simplified form that are further described below in the Detailed Description. This Summary is not intended to identify key features or essential features of the claimed subject matter nor is it intended to be used to limit the scope of the claimed subject matter.

Embodiments of the present disclosure pertain to a satellite navigation receiver having a digital front end. The satellite navigation receiver includes an analog section for receiving, amplifying, and filtering a satellite navigation signal. The digital front end is coupled to the analog section and is used to perform digital signal processing on the satellite navigation signal before it is passed on to the acquisition and tracking engines. In one embodiment, the digital front end includes a spur estimation and cancellation module, a DC estimation and cancellation module, a band pass filter, and a scaling and truncation module. By off-loading some of the functionality from the analog section to the digital front end, the analog section can be made smaller and cheaper and also consumes less power. Moreover, additional functionalities can be added to the digital front end to improve performance. And since the digital front end is comprised of digital circuitry, it scales down in size, cost, and power with advances in semiconductor fabrication techniques.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Figure 1:
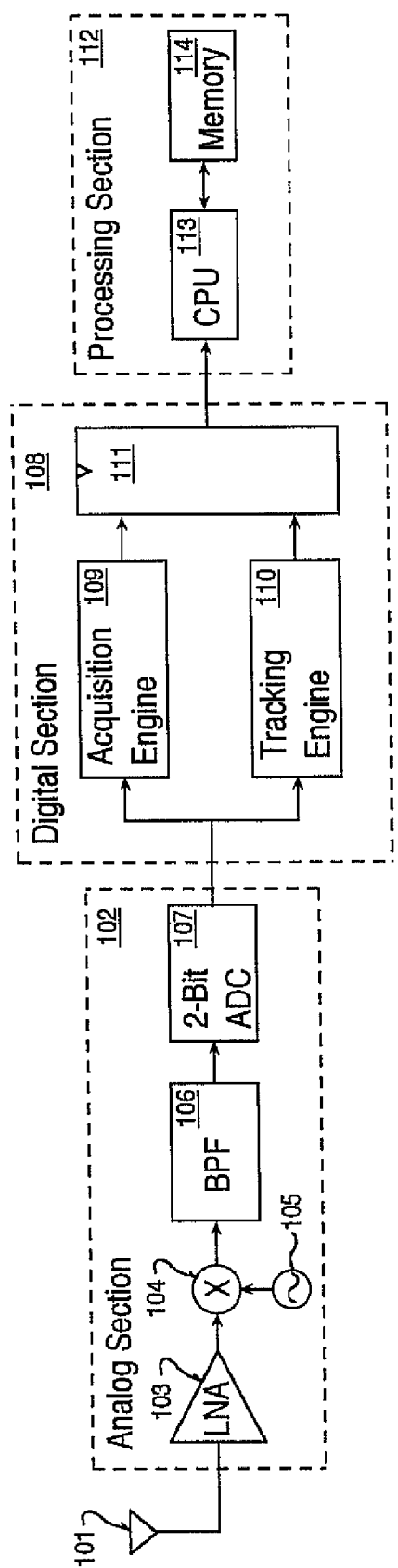
FIG. 1 is a conceptual diagram of a GPS receiver.
Figure 2:
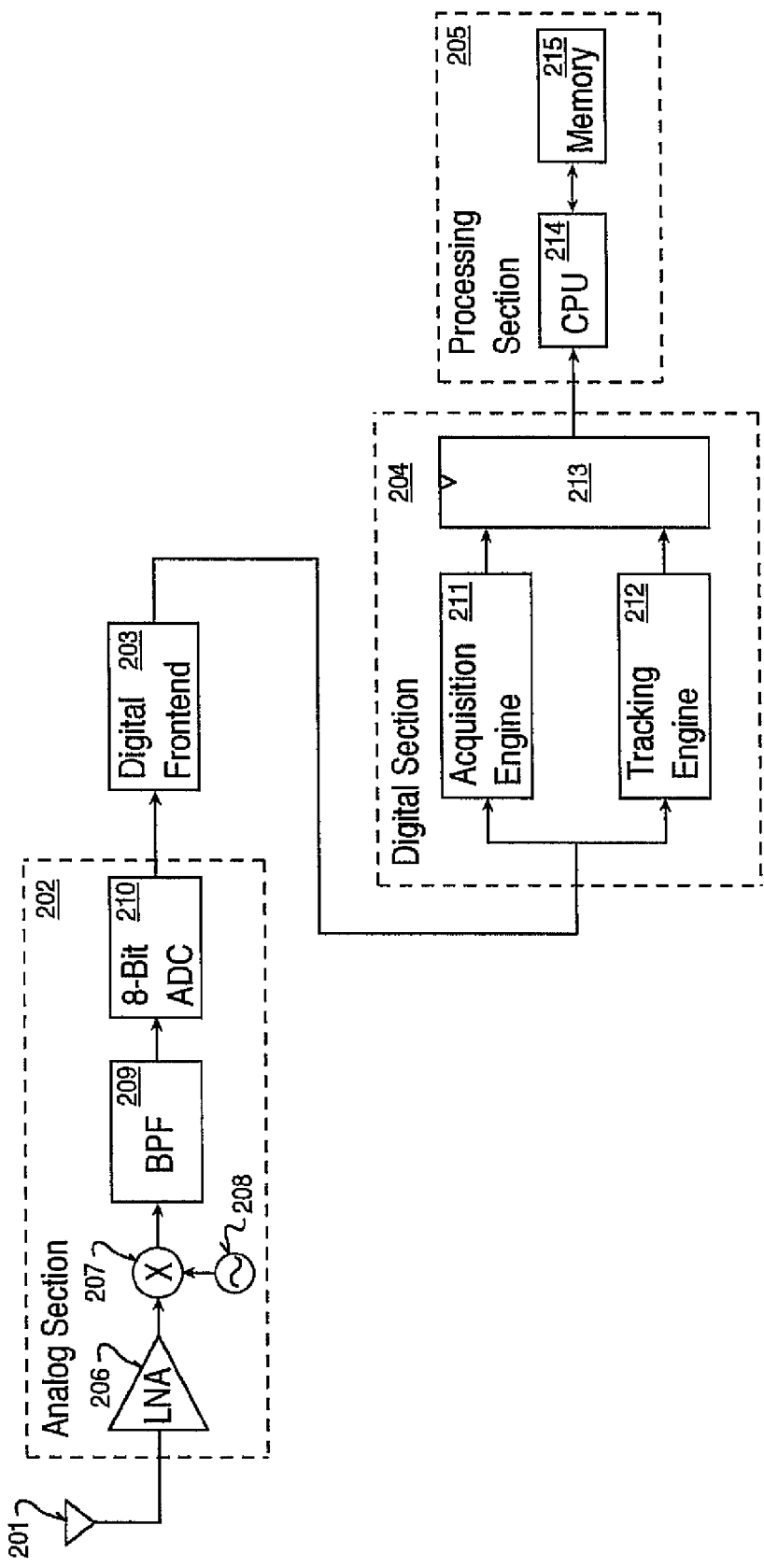
FIG. 2 shows an embodiment of a satellite navigation receiver that has a digital front end.

FIG. 2 shows an embodiment of a satellite navigation receiver that has a digital front end 203. It should be noted that this receiver design can be applied to receive any satellite navigation system, including but not limited to Global Positioning System, GLONASS, Galileo, IRNSS, Beidou, and other yet to be deployed future systems. The digital front end 203 is placed in-between the analog section 202 and the digital section 204. In this embodiment, digital front end 203 is placed after the ADC 210 and before the rest of the baseband circuits. The digital front end 203 is designed to perform digital signal processing on the received satellite navigation signal before it is passed on to the acquisition and tracking engines. The digital front end performs some of the functions traditionally reserved for the analog section as well as to perform new functions to help improve the overall performance of the GPS receiver. By shifting some of the requirements from the analog section 202 onto the digital front end 203, the analog design requirements can be relaxed. This directly translates into an analog section 202 that is smaller, cheaper, and consumes less power than traditional analog sections. Furthermore, digital circuits can leverage off rapid improvements in semiconductor fabrication techniques. This means that digital circuits can be made smaller, cheaper, and operate more efficiently as opposed to analog circuits which may not gain by advances in semiconductor technology, such as feature size decreases.

It should be noted that the digital front end 203 does not necessarily replace or substitute for the analog section. In other words, there may still be a need for an analog section 202 to have an LNA 206, mixer 207, oscillator 208, BPF 209, and ADC 210 to process the received RF satellite navigation signals transmitted from GPS satellites. However, the requirements for the analog section 202 are reduced such that some interference is knowingly designed to be let through. This interference is then digitally suppressed by the digital front end 203. In particular, an 8-bit ADC 210 is implemented to give greater dynamic range. In other embodiments, the ADC can output any number of bits greater than 2 to provide improved dynamic range. The 8-bits input to the digital front end 203 is digitally processed for spur cancellation, DC cancellation, band pass filtering, and then scaled and truncated back to a traditional number of bits (e.g., 2 bits) so that a traditional digital section 204 can process the digital signal in a traditional manner. No special modifications need be made to the acquisition engine 211, tracking engine 212, and registers 213 of the digital section 204 nor to the CPU 214 and memory 215 of the processing section 205. Basically, the acquisition engine 211 is used to acquire the satellite navigation signal, and the tracking engine is used to track an acquired satellite navigation signal. CPU 214 can be a microprocessor, a digital signal processor, or any other such device that may read and execute programming instructions stored in the memory 215.

Figure 3:
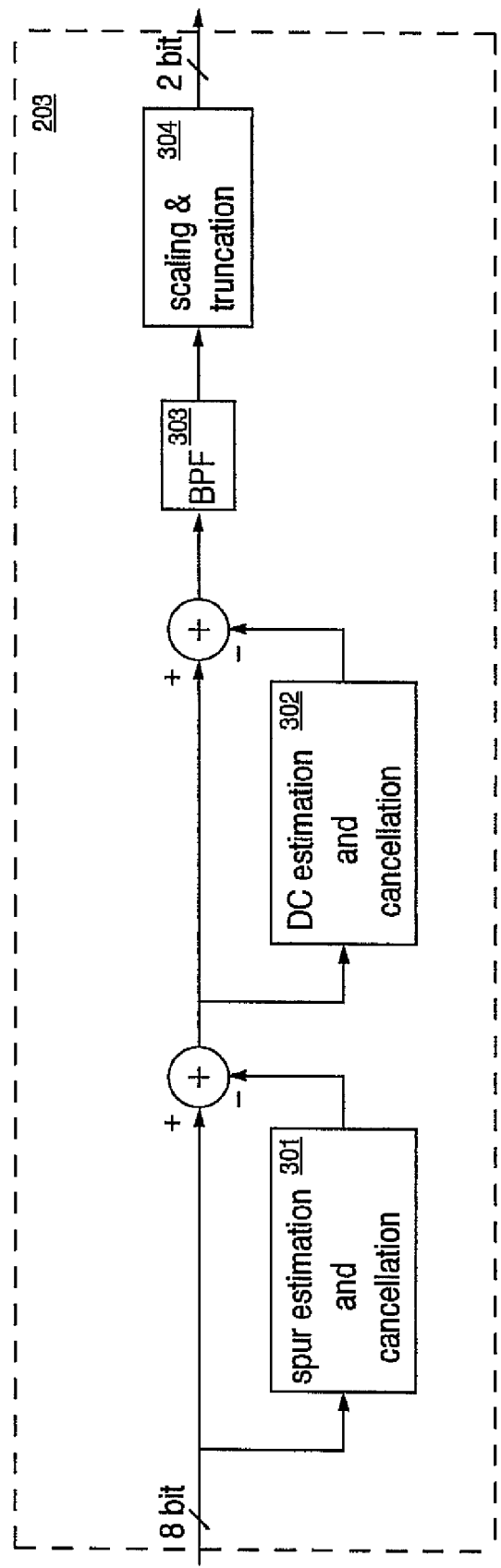
FIG. 3 shows one embodiment of a digital front end having four modules.

FIG. 3 shows one embodiment of a digital front end. In this particular embodiment, the digital front end 203 is comprised of four modules: spur estimation and cancellation module 301, DC estimation and cancellation module 302, band pass filter module 303, and scaling and truncation module 304. The first three modules 301-303 are optional and can be turned on or off independently as needed. The fourth module 304 is always kept on. The operation of the digital front end 203 is as follows. The eight bits from the ADC are input to a spur estimation and cancellation block 301 which estimates the amplitude and phase of the spur. The estimated spur is reconstructed and subtracted out. The digital signal is then input to the DC estimation and cancellation module 302, which estimates the DC component and subtracts it out. Next, a band pass filter module 303 suppresses out-of-band blockers and noise. Lastly, the scaling and truncation module 304 scales and truncates the digital signal down to two bits. This 2-bit digital signal is then output by the digital front end 203 to be processed by the acquisition and tracking engines as normal.

Embodiments for each of the four modules of the digital front end are now described in detail with reference to FIGS. 4-7.

Figure 4:
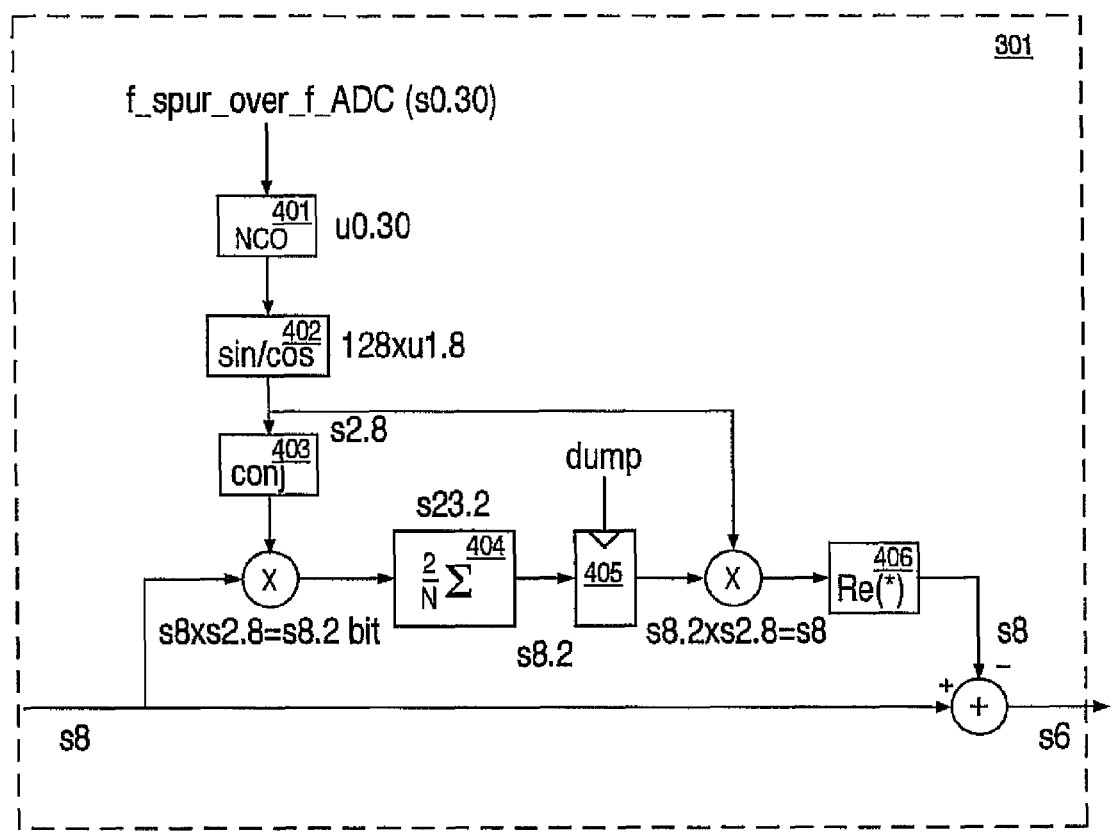
FIG. 4 shows the detailed schematic of one embodiment of a spur estimation and cancellation module.

FIG. 4 shows the detailed schematic of one embodiment of a spur estimation and cancellation module 301. As disclosed above, due to the relaxed constraints imposed on the analog section, some interference (e.g., spurs) is knowingly allowed to be passed through to the ADC. It is the function of the spur estimation and cancellation module 301 to cancel out or otherwise remove any spurs. In one embodiment, a spur is assumed to be comprised of a single tone. Its amplitude and phase is estimated in order to reconstruct the spur. The duplicate, reconstructed spur is then subtracted out to cancel the real spur from the digital IF GPS signal. Although phase noise will smear the spur and create a 'skirt' around the tone, the residual error after canceling the single tone is negligible. This method works better than a notch filter approach because it is very difficult to make a narrow notch filter with negligible distortion to the signal when the notch is placed in band.

More particularly, the frequency of the spur that is to be cancelled over the frequency of the ADC is input to a numerically controlled oscillator (NCO) 401. In one embodiment, the frequency of the spur is known by measuring or predicting the harmonics of the local clock. The maximum frequency of the ADC is 17.9 MHz for this particular embodiment. For a target frequency error of 0.01 Hz (i.e., 3.6 degrees of phase error in one second), one needs log 2(17.9e6/0.01)−1=30 bits. The spur frequency is signed and no greater than half of the ADC frequency. Hence, the input format is s0.30 (signed, with 0 bits to the left of the decimal point and 30 bits to the right of the decimal point). The NCO 401 is used to generate the phase of the spur. In order to obtain a clean cancellation (residual is less than −30 dB), one needs accurate estimations of the spur amplitude and phase. The sin/cos table 402 provides an angle of resolution to be (pi*2)/512 or 128 levels for one quadrant, and the output bit width needs to be 8 (e.g., u1.8—unsigned with one bit to the left of the decimal point and eight bits to the right of the decimal point). The output from sin/cos table 402 becomes s2.8 after sign extension to cover four quadrants. Assuming that the spur in the incoming signal is $$x(t)=a\cos(\omega t+\theta)$$

This is multiplied with the conjugate of the spur phasor $$s(t)=\exp(-j\omega t)$$

The output of the multiplier is $$y(t) = a\cos(\omega t + \theta) \cdot \exp(-j\omega t)$$
$$= \frac{a}{2}(\exp(j(\omega t + \theta)) + \exp(-j(\omega t + \theta))) \cdot \exp(-j\omega t)$$
$$= \frac{a}{2}(\exp(j\theta) + \exp(-j(2\omega t + \theta)))$$

The result is averaged by the 2/N accumulator block 404 over a large block size. In this particular embodiment, the default size is N=4096 samples, and the maximum size is 2^15=32768 samples). The second term diminishes, and the first term (constant) remains. The result is input to register 405 and represents the amplitude and phase of the spur $$\frac{2}{N}\sum_{t=1}^{N} y(t) = a\exp(j\theta)$$

To cancel this spur, the complex value given above is multiplied with the spur phasor. Block 406 takes the real part $$\hat{x}(t) = \text{Re}(a\exp(j\theta) \cdot \exp(j\omega t)) = a\cos(\omega t + \theta)$$

The output from block 406 represents the reconstructed spur and is subtracted to achieve spur cancellation.

It should be noted that the complex multiplier for spur estimation and spur cancellation is s8 by s2.8 with s8.2 output and s8.2 by s2.8 with s8 output respectively. If processing at any point results in data that would overflow a defined digital word width, the data may be clipped and/or set to a maximum value. This is sometimes referred to as saturation. The accumulator needs s23.2 to support the maximum block size, and the average after normalization is s8.2. The estimation is updated when the dump signal to register 405 is asserted at the end of the estimation block. After the spur is removed, the signal size (i.e., the signal digital word width) may be reduced. In this embodiment, the output is s6.

If spur estimation and cancellation is enabled, a new estimation is performed after hardware reset and every gain change. The estimation takes one block of signal and is available immediately after the block. It can run continuously or just periodically. The period should be determined to guarantee the accumulate phase error is acceptable (e.g., 250 ms gives about 1 degree of phase error towards the end with the 30-bit NCO). The cancellation should run continuously. The most recent spur amplitude and phase estimation should be used until the next estimation is available. However, if spur is not present in the system, this spur estimation and cancellation module 301 can be turned off. In this case, the signal should be truncated from 8-bit to 6-bit by means of saturation.

Figure 5:
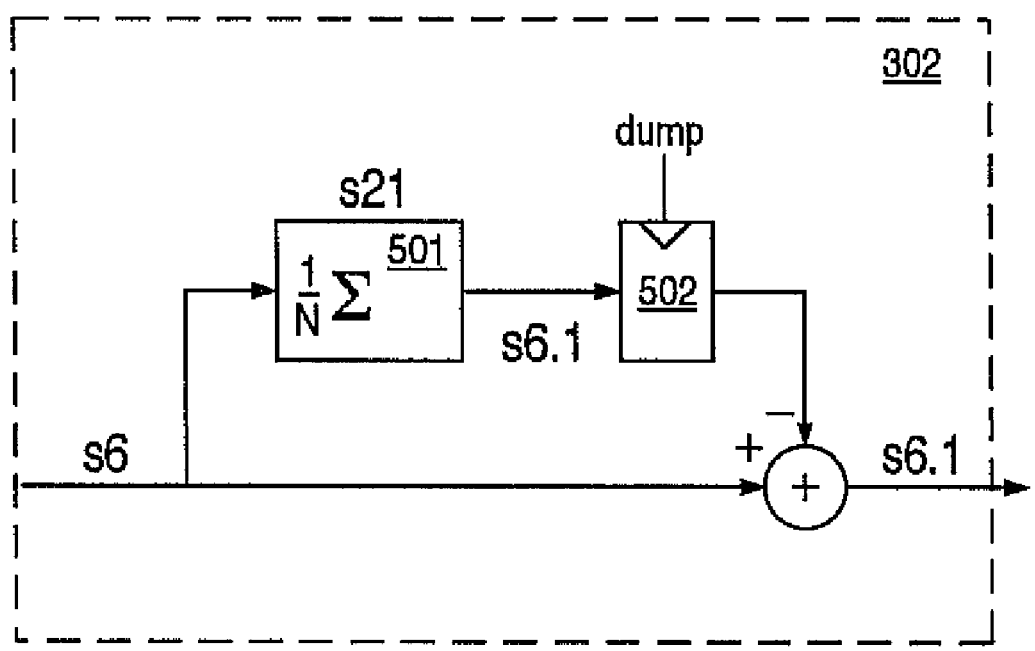
FIG. 5 shows one embodiment of a DC estimation and cancellation module.

After spur estimation and cancellation, DC estimation and cancellation can be performed. DC estimation and cancellation is beneficial because the previous analog components may produce varying degrees of DC offset. Eliminating this DC offset improves performance by making full use of the entire dynamic range. FIG. 5 shows one embodiment of a DC estimation and cancellation module 302. The s6 signal from the spur estimation and cancellation module is input to a 1/N accumulator block 501. Essentially, block 501 is an accumulator, normalized by the sample counts. DC is estimated using one block of samples (e.g., default N=4096, maximum size is 2^15=32768). One fractional bit is kept in the block average to reduce the quantization error. The s6.1 estimated DC signal is fed into register 502 and subtracted at the next active dump signal. The output after DC cancellation is s6.1. The result can be applied immediately after the block.

The DC estimation and cancellation module 302 can be turned on and off. When it is on, a new estimation is performed after hardware reset and every gain change. The estimation can run continuously or periodically. The period should be determined by the drifting characteristics of the DC. The cancellation runs continuously with the most recent estimation. When this module 302 is off, nothing needs to be done except padding a zero fractional bit.

Figure 6:
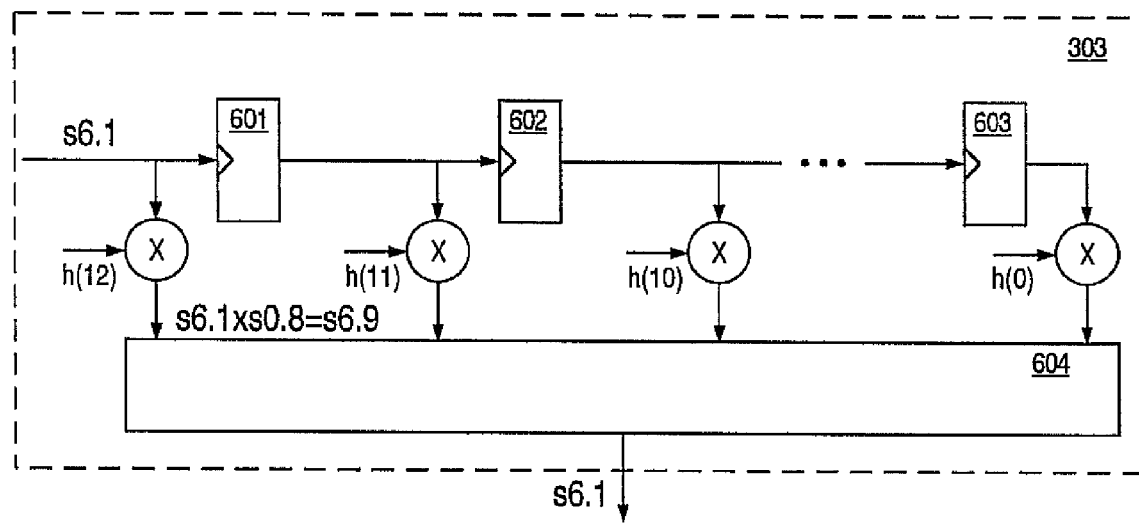
FIG. 6 shows an embodiment of a digital band pass filter module.

Following the DC estimation and cancellation module is the band pass filter module. As described above, some of the interference is knowingly allowed to pass through the analog front end to the ADC. Spur(s) were handled by the spur estimation and cancellation module. Now, any out-of-band blockers and noise may be suppressed by this band pass filter module. FIG. 6 shows an embodiment of a digital band pass filter module 303. In one embodiment, the band pass filter is centered at the IF frequency, and has a bandwidth of approximately 1 MHz on both sides. In other embodiments, the bandwidth of the band pass filter may change depending on the nature of the IF signal. For example, if the IF signal is relatively clean, then the bandwidth of the band pass filter may be greater than 1 MHz on each side which may provide a filtered IF signal with more resolution. Since the IF frequency may change depending on the reference crystal, the filter coefficients, h(0)–h(12), are not fixed. Therefore, multipliers are used instead of hard coded taps. The filter coefficients input to the finite impulse response (FIR) filter 604 are 8 bits (s0.8). The multipliers are s6.1 by s0.8, and the output is s6.9. The result from the FIR filter 604 is, likewise, s6.1.

The band pass filter module 303 can be turned on or off based on blocker and noise suppression requirements. The filter coefficients can be configured by software. With thirteen taps, one can suppress the out-of-band signal by approximately 30 dB. In other embodiments, a different number of taps and different filter coefficients can be implemented to meet the desired frequency response.

In an alternative embodiment, the band pass filter module 303 may be implemented with a low pass filter. In this embodiment, the data from the DC estimation and cancellation module may be mixed or digitally rotated to provide a signal that may be centered at or near DC. This signal may be filtered by a low pass filter instead of a band pass filter. In some embodiments, two low pass filters may be used to filter in phase and quadrature signals that may be centered at or near DC.

Figure 7:
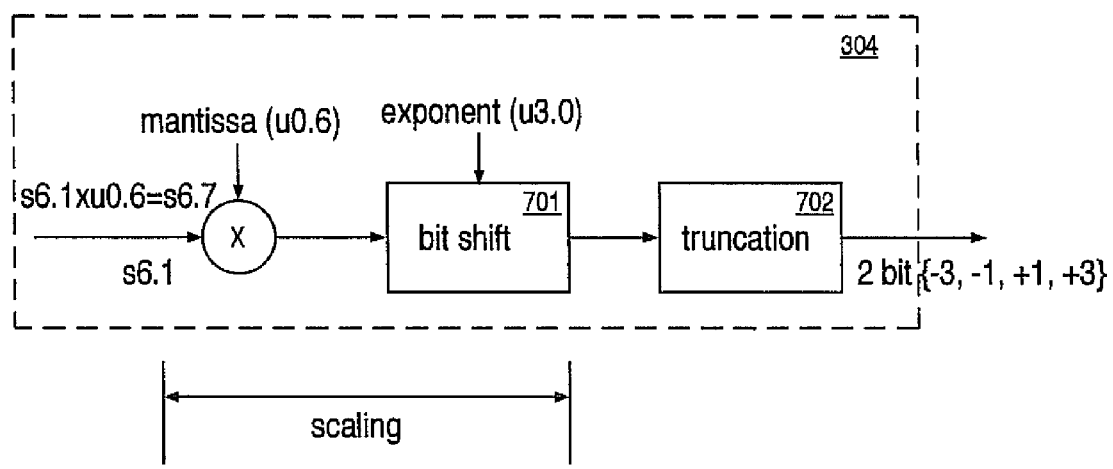
FIG. 7 shows one embodiment of a scaling and truncation module.

The filtered signal is then scaled and truncated by a scaling and truncation module. The function of the scaling and truncation module is to size the signal so that it best fits into the 2-bit signal output from the digital front end. The output signal from the digital front end is scaled and truncated down to two bits so that it can be used by conventional acquisition and tracking engines that have been designed to work on two bits. In other embodiments, the scaling and truncation module can be used to scale and truncate the signal to different number of output bits. FIG. 7 shows one embodiment of a scaling and truncation module 304. This module 304 is always on. It scales and truncates the signal from s6.1 to 2 bits or four levels, {−3, −1, +1, +3}. Due to ADC nonlinearity, the effective ADC quantization error is larger than ½ LSB. Consequently, the signal is sized a little bit higher than the nominal value at the ADC output. By scaling the signal down, the noisy lower bits are discarded, and the dynamic range is reduced. The scaling factor can be computed using the following formula:

$$\frac{3 \cdot 10^{-\text{DFE\_size\_desired}/20}}{2^{N-1} \cdot 10^{-\text{ADC\_size\_desired}/20}}$$

where DFE_size_desired (dB) is the desired signal power relative to the maximum at DFE output, ADC_size_desired (dB) is the desired signal power relative to the maximum at the ADC output, and N is the number of ADC bits. Note that 3 and $2^{N-1}$ are the maximum output at DFE and ADC respectively.

Two separate parameters, ADC_size_desired and DFE_size_desired, are used in order to provide greater freedom to control the signal sizing to balance quantization noise and blocker tolerance. As a result, the scaling factor is not a constant and should be computed by software and passed to the hardware. To accommodate a wide dynamic range, the scaling factor is specified in the format of (mantissa, exponent), where the mantissa is between 0.5 and 1 and represented by six fractional bits (u0.6). The exponent is an integer between zero and seven (u3.0).

The scaling should be implemented as a multiplier followed by a bit shift 701. The multiplier multiplies the input by the mantissa (s6.1 by u0.6), and the output is s6.7. The bit shift 701 shifts the result to the right by the amount specified by the exponent (0 to 7 bits). After scaling, the signal is truncated by truncation block 702 to four levels, {−3, −1, +1, +3}, with the following mapping: (0, 2) mapped to 1; (2 and above) mapped to 3; (−2 and below) mapped to −3; and (−2,0) mapped to −1. The four levels are represented by 2 bits in the format of (sign, magnitude), whereby a magnitude bit=0 means the amplitude is 1 and a magnitude bit=1 means the amplitude is 3. This format is chosen in order to be compatible with many GPS receivers. Other embodiments include different truncation formats that complies with different types of GPS receivers. The output signal from the scaling and truncation module 304 is fed into the digital section 204 for processing.

Figure 8:
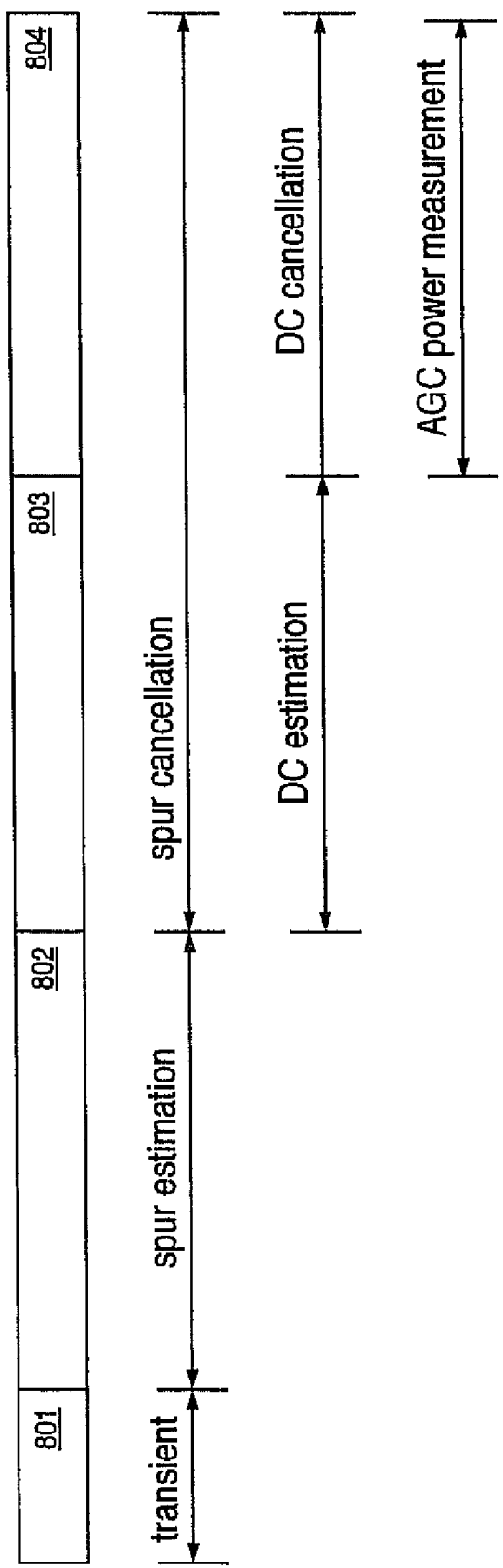
FIG. 8 is a timing diagram for the operation of the various modules of the digital front end.

In one embodiment, the various modules 301-304 of the digital front end 203 operate according to a timing diagram as shown in FIG. 8. The timing diagram is broken into four blocks 801-804. The first block 801 is set aside as a transient period with invalid data after a hardware reset or a gain change, whereby no operation takes place. To avoid interference from spur on DC estimation, which could potentially be an issue when the spur is close to DC, the DC estimation is performed after spur cancellation takes place (if the spur estimation and cancellation module is enabled). In other words, the second block 802 is used for spur estimation. The third block 803 is used for spur cancellation and for DC estimation. The fourth block 804 and all subsequent blocks have both spur and DC cancellation and can also be used for automatic gain control (AGC) power measurement.

Spur and DC estimation is run after hardware reset and before every AGC power measurement. After that, the estimation is repeated periodically after the specified number of blocks. If the period is set to zero, the estimation is only run once and not repeated. If the period is one, then the estimation is performed for every block, or continuously. The AGC operation is performed periodically. Before starting the next AGC measurement, spur and DC estimation is run. If any spur or DC estimation is on going at that time, the estimator will reset and start a new estimation.

Figure 9:
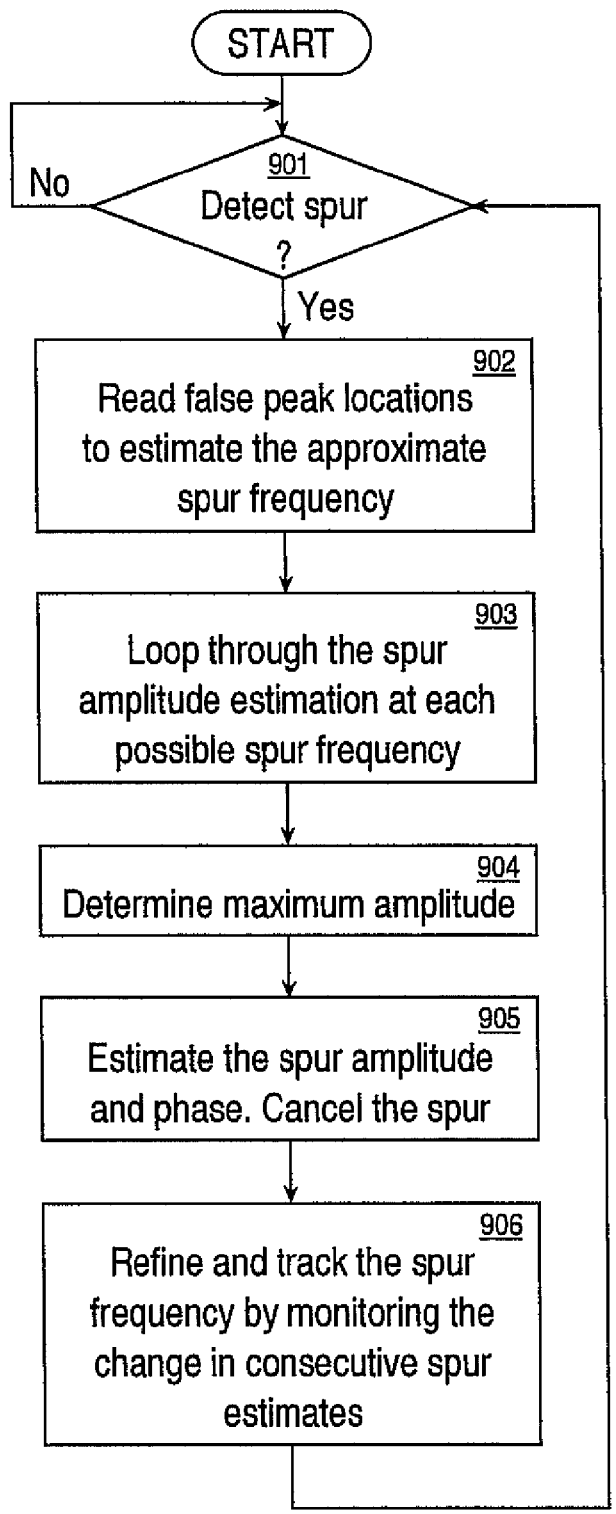
FIG. 9 shows the process for one embodiment of an intelligent spur detector and cancellor.

In one embodiment, an intelligent spur detector and cancellor is implemented. The normal operation of the spur estimation and cancellation module assumes the spur frequency is known and locked to the receiver clock. This is true for receiver generated spur, which is the most common scenario. However, in cases of external spur, whereby the spur frequency is unknown or asynchronous with the receiver, an intelligent spur detector and cancellor methodology can be implemented. Referring to FIG. 9, the process for one embodiment of an intelligent spur detector and cancellor is shown. The first step 901 is to detect whether there is a spur. If there is a strong spur, the correlation performed by the search engine will reveal periodic false peaks, typically spaced at 1 kHz. In step 902, the approximate spur frequency modulo 1 kHz is estimated from reading the false peak locations. Next, step 903 resolves the 1 kHz ambiguity by looping through the spur amplitude estimation at each possible spur frequency. The maximum amplitude corresponds to the actual frequency, step 904. Step 905 estimates the spur amplitude and phase and cancels the spur with the existing hardware. Step 906 refines and tracks the spur frequency by monitoring the change in consecutive spur estimates.

A satellite navigation receiver having a digital front end has now been disclosed. Although illustrative embodiments of the invention have been described in detail herein with reference to the accompanying figures, it is to be understood that the invention is not limited to those precise embodiment. They are not intended to be exhaustive or to limit the invention to the precise forms disclosed. As such, many modifications and variations will be apparent. Accordingly, it is intended that the scope of the invention be defined by the following Claims and their equivalents.

What is claimed is:

1. A satellite navigation receiver comprising:
an analog section for receiving, amplifying, and filtering a satellite navigation signal;
a digital front end, coupled to the analog section, that performs digital signal processing on the satellite navigation signal;
an acquisition engine, coupled to the digital front end, that acquires the satellite navigation signal;
a tracking engine, coupled to the digital front end, that tracks an acquired satellite navigation signal, wherein the digital front end is separate from and coupled between the analog section and the acquisition and tracking engines; and
a processor, coupled to the acquisition engine and the tracking engine, that provides location information, wherein the digital front end includes a spur estimation and cancellation circuit to estimate an amplitude and phase of a spur, to reconstruct the spur, and to subtract the spur from the satellite navigation signal.

2. The satellite navigation receiver of claim 1, wherein the digital front end includes a DC estimation and cancellation circuit.

3. The satellite navigation receiver of claim 2, wherein the DC estimation is comprised of an accumulator normalized by a sample count.

4. The satellite navigation receiver of claim 1, wherein the digital front end includes a digital band pass filter.

5. The satellite navigation receiver of claim 4, wherein the digital band pass filter comprises a finite impulse response filter.

6. The satellite navigation receiver of claim 5, wherein the finite impulse response filter comprises software configurable filter coefficients.

7. The satellite navigation receiver of claim 1, wherein the digital front end includes a scaling and truncation circuit.

8. A satellite navigation receiver comprising:
an analog section for receiving, amplifying, and filtering a satellite navigation signal;
a digital front end, coupled to the analog section, that performs digital signal processing on the satellite navigation signal;
an acquisition engine, coupled to the digital front end, that acquires the satellite navigation signal;
a tracking engine, coupled to the digital front end, that tracks an acquired satellite navigation signal, wherein the digital front end is separate from and coupled between the analog section and the acquisition and tracking engines; and
a processor, coupled to the acquisition engine and the tracking engine, that provides location information, wherein the digital front end includes a scaling and truncation circuit that scales according to a function with two parameters comprised of a desired signal power relative to a maximum power at an output of the digital front end and a desired signal power relative to a maximum power at an output of the analog section.

9. The satellite navigation receiver of claim 1, wherein the digital front end receives an 8-bit signal from the analog section and the digital front end outputs a 2-bit signal.

10. The satellite navigation receiver of claim 1, wherein the digital front end receives an N-bit signal from the analog section and the digital front end outputs a 2 bit, where N>2.

11. A satellite navigation receiver comprising:
an analog section for receiving, amplifying, and filtering a satellite navigation signal;
a digital front end, coupled to the analog section, that performs digital signal processing on the satellite navigation signal;
an acquisition engine, coupled to the digital front end, that acquires the satellite navigation signal;
a tracking engine, coupled to the digital front end, that tracks an acquired satellite navigation signal, wherein the digital front end is separate from and coupled between the analog section and the acquisition and tracking engines; and
a processor, coupled to the acquisition engine and the tracking engine, that provides location information, wherein the digital front end comprises:
a spur estimation and cancellation module;
a DC estimation and cancellation module coupled to the spur estimation and cancellation module;
a band pass filter coupled to the DC estimation and cancellation module; and
a scaling and truncation module coupled to the band pass filter, wherein:
spur estimation is performed before spur cancellation;
DC estimation followed by DC cancellation is performed after spur estimation and concurrent with spur cancellation; and
AGC power measurement is performed after DC estimation and concurrent with DC cancellation.

12. A method for performing digital signal processing in a satellite navigation receiver, comprising:
amplifying a navigation signal;
down-converting the navigation signal to an analog IF signal;
filtering the analog IF signal;
converting the analog IF signal to an equivalent digital IF signal; and
performing digital signal processing on the digital IF signal before acquiring and tracking is performed, wherein the digital signal processing is performed separately from the acquiring and tracking, and wherein the digital signal processing comprises:
estimating an amplitude and phase of a spur;
reconstructing the spur; and
subtracting a reconstructed spur.

13. The method of claim 12, wherein the digital signal processing further comprises:
estimating a DC signal; and
canceling the DC signal.

14. The method of claim 13, wherein estimating the DC signal comprises accumulating a block of samples normalized by a sample count.

15. The method of claim 12, wherein the digital signal processing comprises band pass filtering.

16. The method of claim 15 further comprising inputting programmable filter coefficients to a plurality of taps corresponding to a digital finite impulse response band pass filter.

17. The method of claim 12, wherein the digital signal processing further comprises:
scaling the digital IF signal; and
truncating the digital IF signal.

18. The method of claim 12 further comprising:
converting the digital IF signal to an N-bit signal; and
performing the digital signal processing on the N-bit signal, wherein a signal with less than N-bits is input to an acquisition circuit.

19. A method for performing digital signal processing in a satellite navigation receiver, comprising:
amplifying a navigation signal;
down-converting the navigation signal to an analog IF signal;
filtering the analog IF signal;
converting the analog IF signal to an equivalent digital IF signal;
performing digital signal processing on the digital IF signal before acquiring and tracking is performed, wherein the digital signal processing is performed separately from the acquiring and tracking;
estimating a spur;
canceling the spur after estimating the spur;
estimating a DC component concurrent with cancelling the spur;
canceling the DC component after estimating the DC component; and
performing AGC power measurement concurrent with canceling the DC component.

* * * * *